H. CHRISMAN.
METER.
APPLICATION FILED SEPT. 27, 1910.

1,078,257.

Patented Nov. 11, 1913.
2 SHEETS—SHEET 1.

WITNESSES:

INVENTOR.
Horace Chrisman
BY
HIS ATTORNEY IN FACT.

H. CHRISMAN.
METER.
APPLICATION FILED SEPT. 27, 1910.

1,078,257.

Patented Nov. 11, 1913.

2 SHEETS—SHEET 2.

WITNESSES:

INVENTOR.
Horace Chrisman

BY

HIS ATTORNEY IN FACT.

UNITED STATES PATENT OFFICE.

HORACE CHRISMAN, OF EDGEWOOD PARK, PENNSYLVANIA, ASSIGNOR TO PITTSBURG METER COMPANY, A CORPORATION OF PENNSYLVANIA.

METER.

1,078,257.  Specification of Letters Patent.  Patented Nov. 11, 1913.

Application filed September 27, 1910. Serial No. 584,007.

*To all whom it may concern:*

Be it known that I, HORACE CHRISMAN, a citizen of the United States, and a resident of Edgewood Park, in the county of Allegheny and State of Pennsylvania, have made a new and useful Invention in Meters, of which the following is a specification.

This invention relates to fluid meters, particularly for air and gas, although it may also be used in connection with liquids.

In practice it is not convenient to measure large volumes by passing them directly through the registering mechanism so proportional meters are employed for large volumes through which only a part of the fluid passes. The proportional meters are so constructed that the best results cannot be obtained on relatively low rates of flow so the low rates of flow are best measured by tally or volume meters through which all of the fluid passes.

It is the purpose of my invention to provide means whereby low rates of flow will be measured by being passed directly through a direct volume meter in the main but when high rates of flow are demanded from the same main the direct volume meter will be automatically cut out and a proportional meter will take its place and vice versa.

Figure 1:
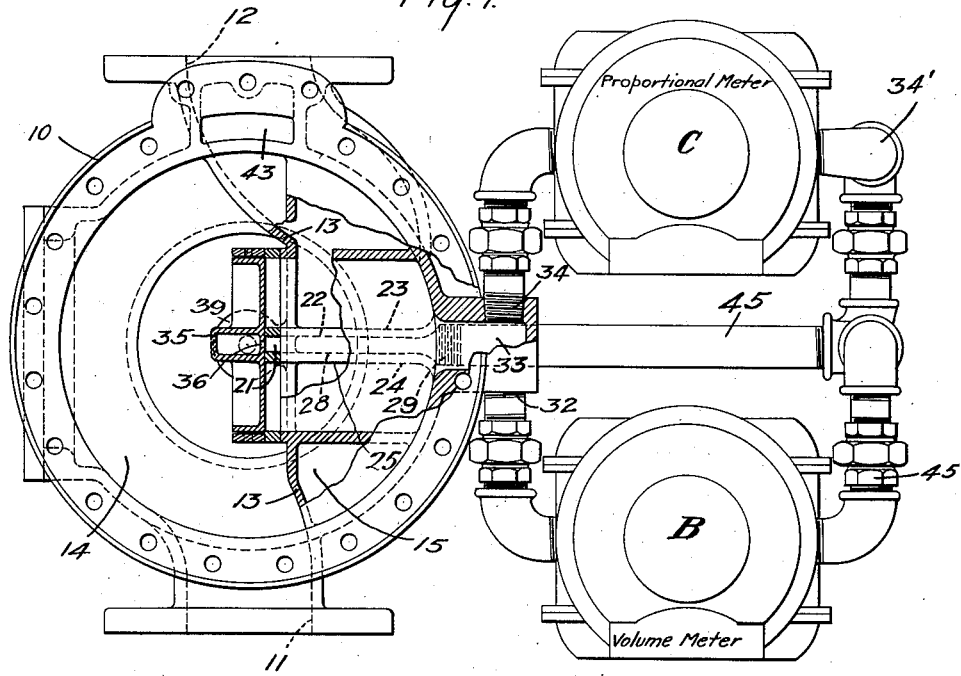
Figure 2:
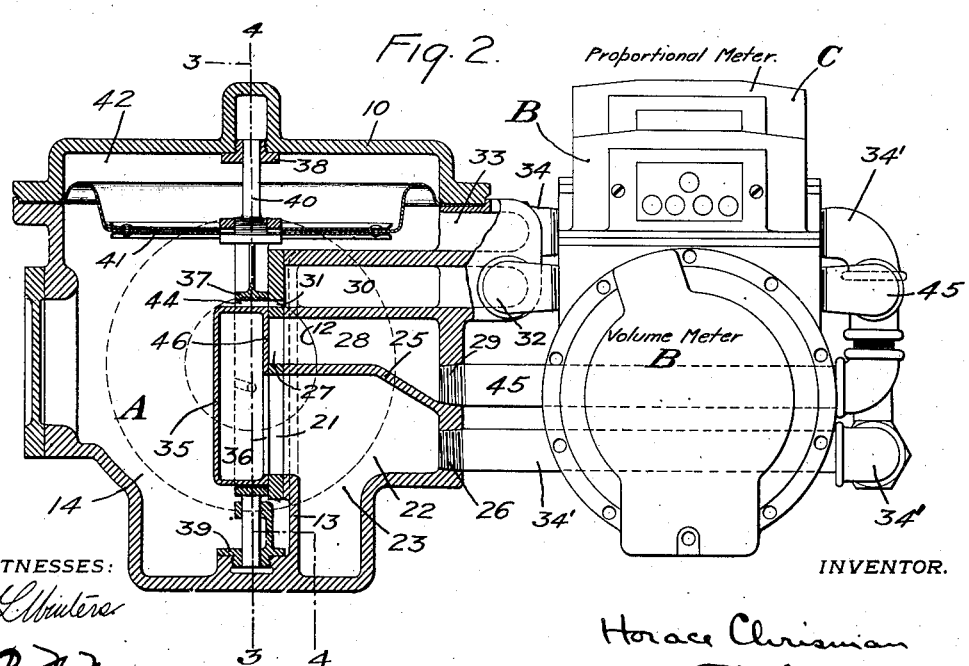
Figure 3:
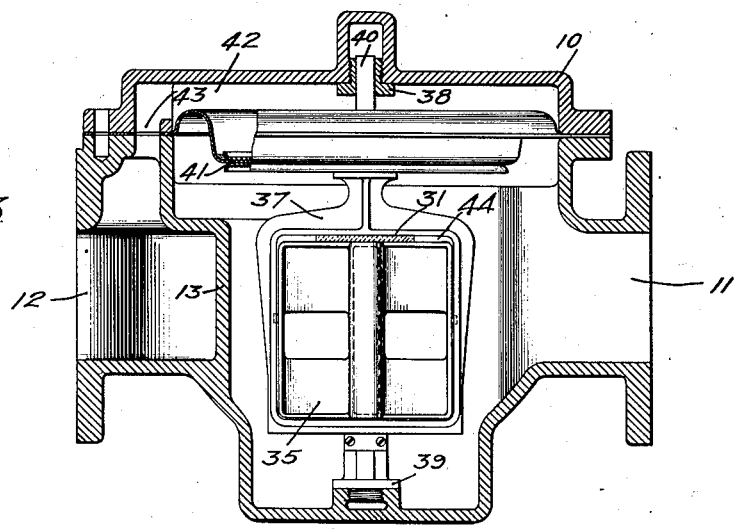
Figure 4:
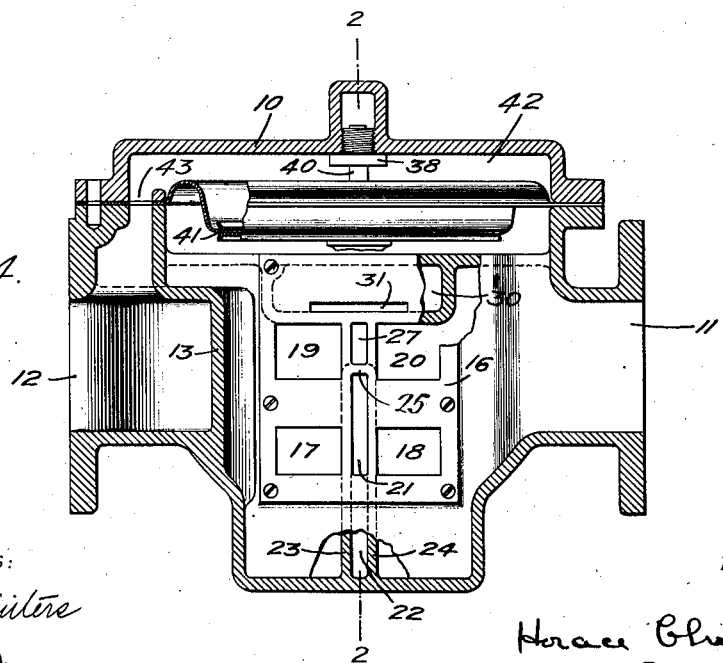

In the drawings: Figure 1 is a view partly in plan and partly in section of a mechanism for carrying out the purposes of my invention; Fig. 2 is a sectional view on the line 2—2 of Fig. 4; Fig. 3 is a sectional view on the line 3—3 of Fig. 2 to illustrate the valve seat, ports in rear of said seat not being illustrated to avoid confusion, the diaphragm being shown partly in elevation; and Fig. 4 is a sectional view partly in elevation on the line 4—4 of Fig. 2.

In the present embodiment of my invention I have illustrated a valve chamber A, a tally or volume meter B and a proportional meter C. The valve chamber A is shown as being provided with a casing 10 having an inlet port 11 and an outlet port 12. Within the casing is a partition 13 dividing the casing into an inlet chamber 14 and an outlet chamber 15. The partition 13 is formed with a valve seat 16 provided with ports 17, 18, 19 and 20. An elongated port 21 is provided in the valve seat 16 and communicates with a chamber 22 formed by the rearwardly extending partitions 23 and 24 which extend to the bottom of the casing 10 and are connected at their upper ends by a top wall 25; chamber 22 being provided with an inlet port 26. Above the port 21 is a port 27 which communicates with a chamber 28 above the chamber 22, said chamber 28 being provided with an inlet port 29. Above the chamber 28 is a chamber 30 having an inlet port 31 and an outlet port 32. Above the chamber 30 is a chamber or conduit 33 having an outlet port 34. Movable on the valve seat 16 is a hollow slide valve 35 having a port 36, said valve 35 being supported in a frame 37 in guides 38 and 39.

Attached to the stem 40 of the valve is a diaphragm 41, the ends of which are fast to the casing so as to form an upper chamber 42 communicating with the outlet port 12 through a port 43. 44 is a port in the valve communicating with the port 31 in the valve seat 16. If the demand is light, that is, if small volumes are to be measured, the fluid entering the valve casing will pass through the ports 44 and 31 into the chamber 30 out through the port 32 and through the volume meter B through the pipe 45 into the chamber 28 and out through the outlet port 12. If the demand increases beyond a determined amount the pressure drop in the chamber 42 (which communicates with the outlet 12) will cause the pressure on the under side of the diaphragm 41 to preponderate to such an extent as to raise the valve and cause the bridge or face 46 of the valve 35 to cover the port 31 and effect communication between the chamber 22 and the chamber 28 whereby the fluid may pass from the conduit or chamber 33 through the pipe 34, the proportional meter C through the piping 34' the chamber 22, ports 17, 18, 19 and 20, chamber 28 and outlet 12. As soon as the demand decreases sufficiently the pressures above and below the diaphragm 41 will be equalized or approximately so, so that the valve 35 may assume approximately the position shown in Fig. 2 so that communication will be cut off between the chambers 22 and 28 and the proportional meter will be cut out; the ports 31 and 44 then registering and the entire volume passing through the valve casing 10 will be measured by the meter B. By the construction illustrated and described the parts of the proportional meter are so proportioned that as soon as there is a pressure drop above the diaphragm sufficient to cause the valve to move up and close the port 31 the outlet port from the proportional meter will open wide enough to cause a measurable amount of gas to pass into the proportional meter so that the proportional meter will begin to register as soon as its outlet port is opened.

It will be apparent from the foregoing description made in connection with the drawings that I have provided means whereby the sensitive mechanism of a volume meter may be employed for measuring small flows within given limits but that as soon as the rate of flow increases beyond a given limit the volume meter will be cut out and the proportional meter will begin to do its work and vice versa.

Having thus described my invention, what I claim is:

1. The combination of a casing, a proportional meter, pipes leading from the casing to the inlet and outlet of said proportional meter, a volume meter, pipes leading from the inlet and outlet of the volume meter to the casing, independent chambers for the respective meters in the casing, a rectangular slide valve for closing communication between the outlet of one meter and the outlet of the casing and simultaneously opening communication between the inlet of the other meter and the inlet of the casing, and means for operating said valve.

2. The combination of a casing having a ported partition, a volume meter, pipes connecting said volume meter to said casing, a proportional meter, pipes connecting said proportional meter to said casing, a hollow rectangular valve for determining the exposed port areas in the casing, said valve having a rectangular port above a hollow portion.

3. The combination with a valve casing, two meters, one of which is a proportional meter, and the other a volume meter, means for connecting said meters to said casing, and means for closing communication between the inlet of one meter and the inlet of the casing and simultaneously opening up communication between the outlet of the other meter and the outlet of the casing, said means comprising a hollow valve, rectangular in form, and having a transverse port extending above the hollow portion, and a diaphragm for operating said valve.

In testimony whereof, I have hereunto subscribed my name this 26th day of September, 1910.

HORACE CHRISMAN.

Witnesses:
C. W. McGhee,
B. F. Funk.